United States Patent [19]
Shiino et al.

[11] Patent Number: 5,846,920
[45] Date of Patent: Dec. 8, 1998

[54] CLEANING AGENT FOR REMOVING SOLDERING FLUX BASED ON ALKYLENE GLYCOL BRANCHED MONOALKYL ETHER

[75] Inventors: Toru Shiino, Hirakata; Kenichi Nobuta, Ikoma; Yoshikazu Yamagata, Katano; Tokihiko Shimizu, Ikoma-gun, all of Japan

[73] Assignee: Matsushita Electric Industrial Co., Ltd., Osaka-fu, Japan

[21] Appl. No.: 621,324

[22] Filed: Mar. 25, 1996

Related U.S. Application Data

[63] Continuation of Ser. No. 307,054, Sep. 16, 1994, abandoned.

[30] Foreign Application Priority Data

Sep. 17, 1993 [JP] Japan .................................. 5-231614

[51] Int. Cl.$^6$ ................................ C11D 7/50; C23G 5/02
[52] U.S. Cl. ........................ 510/175; 510/176; 510/405; 510/407; 510/413; 510/421; 510/506
[58] Field of Search ................................ 510/175, 176, 510/421, 506, 535, 413, 405, 407; 134/2, 38–42

[56] References Cited

U.S. PATENT DOCUMENTS

| | | | |
|---|---|---|---|
| 3,882,038 | 5/1975 | Clayton et al. | 252/164 |
| 3,886,099 | 5/1975 | Hall | 252/548 |
| 4,077,896 | 3/1978 | Bunegar et al. | 252/90 |
| 4,845,008 | 7/1989 | Nishioka et al. | 430/165 |
| 4,983,224 | 1/1991 | Mombrun et al. | 134/40 |
| 5,039,441 | 8/1991 | Thomas et al. | 252/142 |
| 5,213,745 | 5/1993 | Izod et al. | 264/203 |
| 5,256,209 | 10/1993 | Chihara et al. | 134/38 |
| 5,330,582 | 7/1994 | Chihara et al. | 134/40 |

FOREIGN PATENT DOCUMENTS

| | | |
|---|---|---|
| 61-267501 | 11/1986 | Japan . |
| 3-162496 | 7/1991 | Japan . |
| 3162496 | 7/1991 | Japan . |
| 4-59898 | 2/1992 | Japan . |
| 5-271693 | 10/1993 | Japan . |

OTHER PUBLICATIONS

Chemical Abstracts, vol. 54, No. 18, 18332b, Sep. 25, 1960.

Fanning et al., "Ultrasonic absorption in the water–2–isobutoxyethanol system", Can.J. Chem., 48(13), 2052–60, 1970.

Shindo et al., "Densities and refractive indices of aqueous mixtures of alkoxy alcohols", J. Chem. Eng. Data, 24(2), 106–10, 1979.

Chemical Abstracts accession No. 107:19528, for JP 61267501, Nov. 27, 1986, & corresponding registry #18912–80–6, 1986.

Aratono et al., "Thermodynamic Consideration on the interface formation of water and ethylene glycol isobutyl ether mixture", Colloid Polym. Sci., 268(9), 877–82, 1990.

Davis et al., "Analysis and interpretation of excess molar properties of amophopole +water systems. Part 3. Excess molar volumes of isopropoxyethanol +water and isobutoxyethanol +water", Thermochim. Acta, 190(2), 259–65, 1991.

Chiavone–Filho et al., "Vapor–liquid equilibria for glycol ether +water systems", J. Chem. Eng. Data, 38(1), 128–31, 1993.

*Primary Examiner*—Ardith Hertzog
*Attorney, Agent, or Firm*—Wenderoth, Lind & Ponack

[57] ABSTRACT

A cleaning agent for removing a residue of soldering flux, which essentially consists of mono-, di-, or tri-alkylene glycol mono branched $C_3$–$C_5$ alkyl ether, which can remove with high safety both ionic residues and resinous materials contained in a soldering flux, which remain on the surface of a soldered electronic substrate. The cleaning agent of the present invention does not adversely affect the insulation and materials used in an electronic device.

5 Claims, 2 Drawing Sheets

- ● - : A CLEANING AGENT OF THE PRESENT INVENTION CONTAINING DIETHYLENE GLYCOL MONOISOBUTYL ETHER
- □ - : A COMMMERCIALLY AVAILABLE CLEANING AGENT CONTAINING A GYLCOL ETHER
- ◇ - : A COMMMERCIALLY AVAILABLE CLEANING AGENT CONTAINING HYDROCARBONS
- × - : A POLYETHYLENE GYLCOL TYPE SURFACE ACTIVE AGENT
- + - : A POLYOXYETHYLENE/POLYOXYPROPYLENE GYLCOL ALKYL ETHER

CLEANING AGENT FOR REMOVING SOLDERING FLUX BASED ON ALKYLENE GLYCOL BRANCHED MONOALKYL ETHER

This application is a continuation of now abandonded Ser. No. 08/307,054 filed Sep. 16, 1994.

BACKGROUND OF THE INVENTION

The present invention relates to a cleaning agent for removing a soldering flux, especially useful for removing a flux residue on an electronic device such as a printed substrate which is necessarily soldered.

Mixed solvent of chloro-fluorocarbons (referred to as a CFC hereinafter), chlorine-containing organic solvents such as typically trichloroethane and the like with alcohols such as ethanol, isopropanol (referred to as IPA hereinafter), and the like have been used for cleaning off a soldering flux remaining on an electronic device such as a printed substrate after it has been soldered.

Use of the these chlorine-containing organic solvents has been necessarily controlled in view of the recent global environmental problems. For instance, it has been recently pointed out that the CFC possibly breaks the ozone layer and that the chlorine-containing organic solvent is a carcinogenic substance and causes contamination of subterranean water because of its high permeability into the ground.

As a substituent of a cleaning agent containing such chlorine-containing organic solvent there have been proposed various kinds of cleaning agents comprising nonaqueous solvents such as alcohols, petroleum distillates, terpenes, and the like or aqueous solution containing surface active agents.

These cleaning agents, however, have a problem that the ability to simultaneously remove both of ionic ingredients and resinous components is low.

Alternatively, the use of ether compounds for such a cleaning agent has been also proposed, which has lately attracted considerable attention as a substituent for the chlorine-containing organic solvent. As such prior arts there are Japanese Patent KOKOKU No. Hei 4-53920, Japanese KOKAI No. Hei 3-62895, Japanese Patent KOKAI No. Hei 3-62897, and Japanese Patent KOKAI Hei 3-146597. Japanese Patent KOKAI No. Hei 4-57899 (U.S. Pat. No. 5,256, 209) discloses a cleaning agent for removing rosins in a soldering flux, which contains oligo-ethylene glycol alkyl ether, but it also contains a nonionic surface active agent and a phosphate anionic surface active agent as an essential component. The use of nonionic surface active agent will cause problems of foam and another rinsing process by pure water, and this prior art does not discloses the use of an oligo-ethylene glycol having a branched alkyl group. Japanese KOKAI No. Hei 3-162496 discloses a cleaning agent comprising diethylene glycol monoalkyl ether, in which the alkyl group has a carbon number 4 to 8. This prior art concretely disclose neither the use of branched alkyl ether nor especially remarkably advantageous effect obtained from a branched alkyl ether when it is applied for removing rosins in a soldering flux.

As aforementioned the use of various kinds of ether compounds has been proposed, but some of the ether compounds provide an insufficient cleaning effect or adverse effect to the device to be cleaned or after cleaned.

SUMMARY OF THE INVENTION

The present invention provides a safe cleaning agent for solving the above problems, having a high ability to dissolve and remove the resinous materials and simultaneously ionic materials without any adverse effects on the materials other than the resin in a soldering flux and without influencing to the insulating property even if the cleaning agent remains on the electronic device.

The cleaning agent for removing a soldering flux according to the present invention consists essentially of alkyl glycol ether compounds represented by the following formula:

$$R-(OC_mH_{2m})_nOH$$

wherein R represents a branched $C_3$–$C_5$ alkyl group, m is 2 or 3, and n is 1–3, and water if desired.

DETAILED DESCRIPTION OF THE INVENTION

Figure 1:
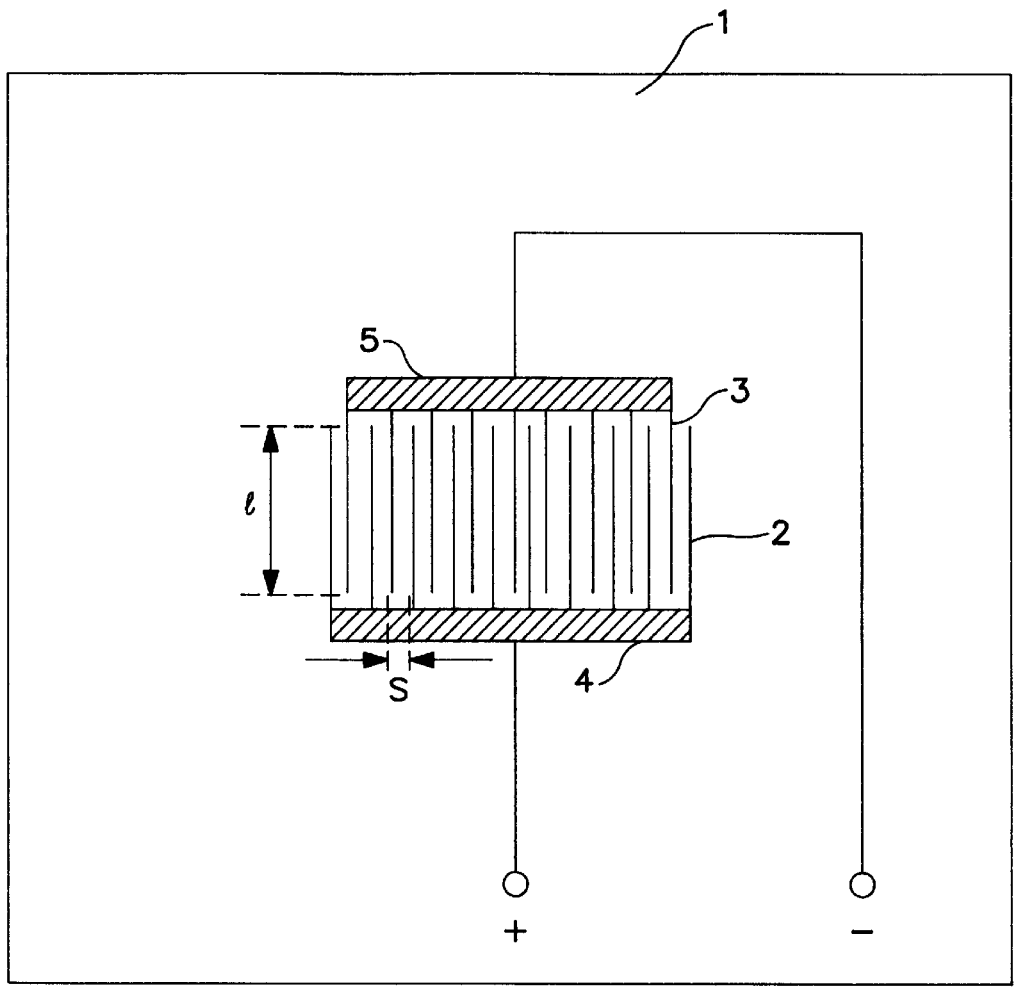
FIG. 1 is a schematic view of a substrate for insulation evaluation test used in the Example 4.

The present invention relates to a cleaning agent for removing a soldering flux according to the present invention consisting essentially of alkylene glycol monoalkyl ethers represented by the following formula:

$$R-(OC_mH_{2m})_nOH$$

wherein R represents a branched $C_3$–$C_5$ alkyl group, m is 2 or 3, and n is 1–3, or said alkylene glycol monoalkyl ether and water.

Concrete examples of R include isopropyl, isobutyl, secondary butyl, tertiary butyl, isoamyl, 2-methyl-1-butyl, 3-pentyl, 2-pentyl, 3-methyl-2-butyl, 2-methyl-2-butyl and neopentyl. Most preferable alkyl group is branched $C_4$ alkyl, especially isobutyl. R may represent a mixture of these alkyl groups.

The alkylene glycol is ethylene glycol (m=2) and n- or iso-propylene glycol (m=3), more preferably ethylene glycol, and n is an integer of 1 to 3, preferably 2 (dialkylene glycol). The dialkylene glycol and trialkylene glycol may be a mixed reaction product of ethylene oxide and propylene oxide. Most preferable alkylene glycol is diethylene glycol.

The most preferable alkylene glycol monoalkyl ether is ethylene glycol monoisobutyl ether, diethylene glycol monoisobutyl ether, or triethylene glycol monoisobutyl ether, especially diethylene glycol monoisobutyl ether.

These alkylene glycol monoalkyl ethers may be mixed with each other, or with other solvents which are usually used for a cleaning agent for a soldering flux, for instance, other alkylene glycol alkyl ethers such as diethylene glycol mono-n-butyl ethers, ethylene glycol monoethyl ether, ethylene glycol diethyl ether and the like. The content of the alkylene glycol monoalkyl ether of the present invention should be at least 50% by weight based on the total weight of the cleaning agent, more preferably at least 70% by weight, especially 75–95% by weight or more. The cleaning agent of the present invention may contain water, but the amount of the water should not exceed 50% by weight. The flash point of the cleaning agent of the present invention can be controlled by the addition of water, especially more than 5% by weight of the total weight of the cleaning agents.

The alkylene glycol monoalkyl ether of the present invention can selectively remove both ionic residues and resinous materials in the flux residue without damaging the resinous materials used in the electronic device. The alkylene glycol monoalkyl ether of the present invention provides a high safety cleaning agent which does not adversely influence the insulation even if it remains on the surface of the electronic device.

Following advantageous effects can be obtained by the use of the branched alkyl ether:

(1) a high removability of ionic residues and resinous materials in a soldering flux, (2) a high rinsing property due to its high solubility in water and hydrocarbons, (3) a high safety because of its own low flash point and capability of being made incombustible by mixing with water, and (4) a low toxicity.

Especially, the removability of the ionic residues and resinous materials by the selected alkylene glycol mono branched alkyl ether is critically high in comparison with a linear alkyl ether. Further, the diethylene glycol monoisobutyl ether does not give any adverse influence to the insulation even if it remains on the surface of an electronic device.

The cleaning agent of the present invention may contain other additives such as surface active agents, corrosion inhibitors, antifungal agents, defoaming agents, antioxidants, or other additives usually used in conventional cleaning agents for soldering flux within such amount that these additives do not influence the insulation when they remain on the device.

The amount of the glycol ether of the present invention is preferably at least 5% by weight of the total amount of the cleaning agent in order to give an excellent removability of the soldering flux.

The cleaning of the electronic device may be carried out by dipping, agitation, ultrasonic rinsing, spraying, and the like. These methods may be used singly or in combination.

The present invention is illustrated according to the Examples, but should not be interpreted to be limited thereby.

EXAMPLE 1

A print substrate having a surface area of 5 cm$^2$ with condensers was treated with a rosin-containing soldering flux (available from ASAHI CHEMICAL RESEARCH LABORATORY CO., LTD., AGF-200-J3) to give test pieces. The test pieces were cleaned with the cleaning agents A–E using diethylene glycol monoisobutyl ether (DEGMIBE), each formulation of which was shown in Table 1. The cleaning process was shown in Table 2.

TABLE 1

| cleaning agent | DEGMIBE (wt. %) | water (wt %) |
|---|---|---|
| A | 100 | 0 |
| B | 90 | 10 |
| C | 75 | 25 |
| D | 50 | 50 |
| E | 25 | 25 |

TABLE 2

| process | | temperature °C. | washing time sec. | method |
|---|---|---|---|---|
| a | cleaning agent | 60 | 60 | dipping ultra-sonic |
| b | tap water | 60 | 60 | dip. agitation |
| c | deionized water | 60 | 60 | dip. agitation |
| d | drying | 80 | 600 | hot air blow |

The removability by each cleaning agents after the treatment by the above process was evaluated by determination of the amount of the residual ionic materials on each test piece using Omega Meter Model 600SC (available from ALPHAMETALS INC.). Using the same test pieces, the same process and the same determination method, the removabilities obtained from CFC, IPA, commercially available terpene and paraffin respectively were evaluated to compare with those obtained from the present invention. The results were shown in Table 3.

TABLE 3

| cleaning agent | amount of ionic residue ($\mu$g NaCl/in$^2$) |
|---|---|
| A | 9.0 |
| B | 16.0 |
| C | 18.0 |
| D | 26.2 |
| E | 38.1 |
| CFC | 24.8 |
| IPA | 37.7 |
| terpene type | 15.4 |
| paraffin type | 16.8 |
| not washed | 42.8 |

As apparent from Table 3 the cleaning agent containing diethylene glycol monoisobutyl ether of 5% by weight or more exhibits the same or higher removability of the ionic residues than the other typical conventional cleaning agents do. Accordingly, the cleaning agent of the present invention desirably contains diethylene glycol monoisobutyl ether more than 50% by weight in order to remove the ionic residues of a soldering flux, especially 75% by weight or more if higher removability is required.

EXAMPLE 2

The removability of the resinous materials contained in a soldering flux was evaluated. The test pieces and formulations of the cleaning agents are the same as those used in the EXAMPLE 1.

The test pieces were dipped into the cleaning agents of the present invention, and then an ultrasonic wave was applied. The test pieces were taken out of the cleaning agents with given intervals, and the time when the residue of resinous materials could not be observed by an eye using an optical microscope was recorded. The removability of the resinous material of the soldering flux was observed using the same matter as the above but using CFC, IPA, a commercially available terpene, and paraffins as comparative examples. The results were shown in Table 4.

As apparent from Table 4, the cleaning agent of the presents invention desirable contains at least 50% by weight or more of diethylene glycol monoisobutyl ether in view of the cleaning time being within 10 minutes in usual cleaning process.

As apparent from the results from the Examples 1 and 2 the cleaning of the present invention desirably contains diethylene glycol monoisobutyl ether at least 50% by weight in order to achieve the simultaneous removal of ionic residues and resinous materials in a soldering flux, and especially at least 75% by weight if a higher removability is required.

Further since the cleaning agent containing 5% by weight or more of water in the diethylene glycol monoisobutyl ether, which is one of the alkylene glycol ethers of the present invention, does not show a flash point, a preferable cleaning agent which has a high removeability of a soldering flux as well as safety preferably contains such alkylene glycol ether between 75% by weight and 50% by weight.

TABLE 4

| cleaning agent | temperature °C. | removing time min. |
|---|---|---|
| A | room temp. | 5 |
|   | 60 | 1 |
| B | room temp. | 5 |
|   | 60 | 1 |
| C | room temp. | 10 |
|   | 60 | 5 |
| D | room temp. | >15 |
|   | 60 | 10 |
| E | room temp. | >15 |
|   | 60 | >15 |
| CFC | room temp. | 1 |
|   | 60 | 1 |
| IPA | room temp. | >15 |
|   | 60 | 10 |
| terpene type | room temp. | >15 |
|   | 60 | 3 |
| paraffin type | room temp. | >15 |
|   | 60 | 10 |

EXAMPLE 3

The influence of the cleaning agent of the present invention against the materials of the electronic device was evaluated. Test pieces used for the electronic device were dipped into the diethylene glycol monoisobutyl ether which was one of the materials used in the present invention for one hour at room temperature. The test pieces were a flat plate of 3×3 cm$^2$. The test pieces were made of copper (Cu), aluminum (Al), and stainless (SUS) as a metal; and polycarbonates (PC), acryl/butadiene/styrene copolymers (ABS), polypropylenes (PP), epoxy resins (EP), and amorphous epoxy resins (am. EP) as a resin respectively. Further, the influence against a coated film made of polyvinyl chloride on a lead wire was also evaluated. The surfaces of the test pieces subjected to this experiment were observed by an optical microscope. The same experiments were repeated using CFC, ethonal, IPA, diethylene glycol diethyl ether (DEGDEE), diethylene glycol n-hexyl ether (DEGnHE), a commercially available hydrocarbon type cleaning agent, and a commercially available surface active agent-containing cleaning agent respectively in order to compare the influence of the present invention with these conventional ones. The results were shown in Table 5.

As apparent from these results the cleaning agents which exhibited no influence on all of the metals and resins were only diethylene glycol monoisobutyl ether, CFC, ethanol, and IPA. Accordingly, the cleaning agent of the present invention does not give any influence on the materials used for the electronic devices.

TABLE 5

|   | metal | | | resin | | | | | |
|---|---|---|---|---|---|---|---|---|---|
| cleaning agent | Cu | Al | SUS | PC | ABS | PP | EP | am. EP | coat |
| DEGMIBE | ○ | ○ | ○ | ○ | ○ | ○ | ○ | ○ | ○ |
| CFC | ○ | ○ | ○ | ○ | ○ | ○ | ○ | ○ | ○ |
| ethanol | ○ | ○ | ○ | ○ | ○ | ○ | ○ | ○ | ○ |
| IPA | ○ | ○ | ○ | ○ | ○ | ○ | ○ | ○ | ○ |
| DEGDME | ○ | ○ | ○ | X | ○ | ○ | ○ | X | X |
| DEGnHE | ○ | ○ | ○ | ○ | ○ | ○ | ○ | X | ○ |
| hydrocarbon | ○ | ○ | ○ | ○ | ○ | ○ | ○ | X | ○ |
| surfactant | ○ | ○ | ○ | X | ○ | ○ | ○ | X | X |

The marks in Table 5 mean as follows:
Metal and Resin: ○ no change
X changed, crack was observed
coat: ○ no change
X exfoliation was observed

EXAMPLE 4

The influence on the electrical insulation when the cleaning agent of the present invention remained was evaluated. The substrates (1) for the insulation evaluation as shown FIG. 1 were used. The substrates (1) for the insulation evaluation were made according to JIS -Z-3197. The specification of the substrates (1) used in this example was shown in Table 6. The substrates were coated with diethylene glycol monoisobutyl ether (500 $\mu$l), and held for 30 minutes in a thermostat maintained at 100° C. After that the treated substrates were put in an air-conditioned room controlled at a temperature of 60° C. and 95% RH, and a direct voltage of 50 V was applied between the positive conductors (2) and negative conductors (3). The insulation between the positive and negative conductors was determined with given intervals. The determination was carried out under the condition of 60° C. and 95% RH. The results were shown in FIG. 2. The same tests as the above were carried out using a commercially available cleaning agent containing a glycol ether, a commercially available cleaning agent containing hydrocarbons, polyethylene glycol type surface active agents, and polyoxyethylene/polyoxypropylene alkyl ethers respectively, and the insulations were determined for comparing the results of the cleaning agents of the present invention with them. The results were show in FIG. 2.

Figure 2:
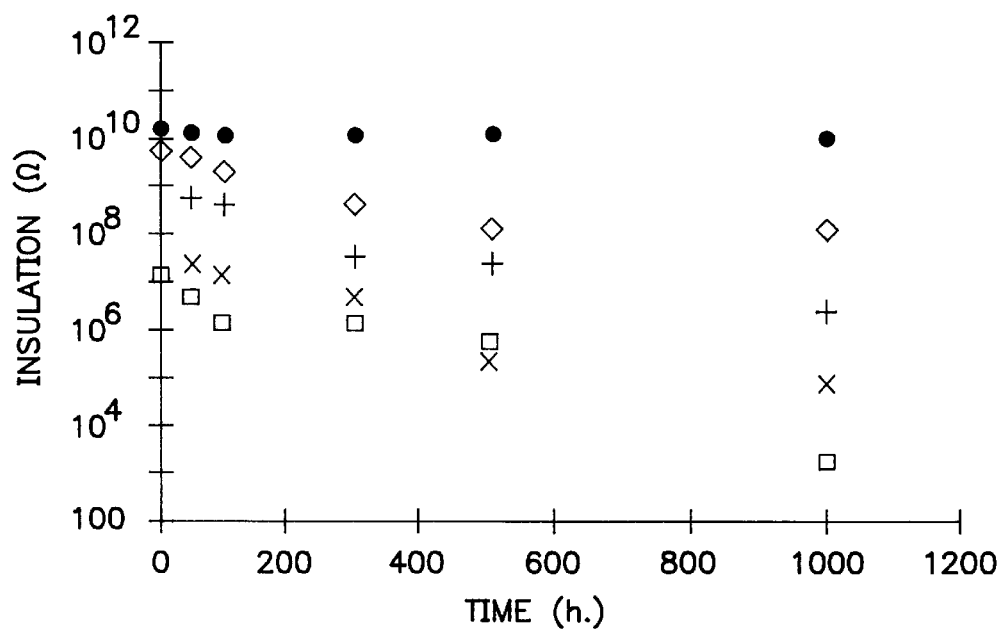
FIG. 2 is a graph illustrating the change of the insulation with time in the Example 4.

As shown in FIG. 2 the diethylene glycol monoisobutyl ether was excellent in the insulation for 1000 hours, and did not influence the insulation even if it remained on the electronic device. As apparent from FIG. 2 the results obtained from the cleaning agent of the present invention showed the similar insulation to that of a substrate cleaned with CFC or that of a substrate not coated with the cleaning agents.

TABLE 6

| substrate | glass substrate with epoxy resin |
|---|---|
| electrodes (4) and (5) | copper |
| shape of electrodes | comb |
| breadth of conductors (2) and (3) | 0.318 mm |
| space between conductors (s) | 0.318 mm |
| overlapping length of conductors (l) | 15.75 mm |

The Example 1 illustrates (a) the removability of ionic residues in a soldering flux, the Example 2 illustrates (b) the removability of resinous materials in a soldering flux, the Example 3 (c) the influence to the substrates, and the Example 4 (d) the influence to the reliability.

The cleaning agent for a soldering flux of the present invention gives excellent results in the above (a) to (c).

The effects of the present invention are:

(1) the ionic residues and the resinous materials in a soldering flux can be simultaneously removed, (2) the material used in an electronic device is not adversely affected, (3) an excellent insulation of an electronic device can be maintained after cleaning, (4) the cleaning agent has a high flashing point, and can be made incombustible by addition of a given amount of water, (5) it can be mixed with not only water but also a hydrocarbon in a desirable amount, and (6) it has an excellent rinsing property.

What is claimed is:

1. A cleaning agent for removing a soldering flux consisting of at least 75% by weight of diethylene glycol monoisobutyl ether and a positive amount up to 25% by weight of water.

2. A cleaning agent of claim 1, which consists of 75–95% by weight of diethylene glycol monoisobutyl ether and 5–25% by weight of water.

3. A method of removing soldering flux from an electronic device having a soldering flux thereon, which comprises cleaning the electronic device with a cleaning agent consisting of 75–100% by weight of diethylene glycol monoisobutyl ether and 0–25% by weight of water.

4. A method of claim 3, in which the cleaning agent consists of 90–100% by weight of diethylene glycol monoisobutyl ether and 0–10% by weight of water.

5. A method of claim 3, in which the cleaning agent consists of diethylene glycol monoisobutyl ether and 0–5% by weight of water.

* * * * *